Figure 1:
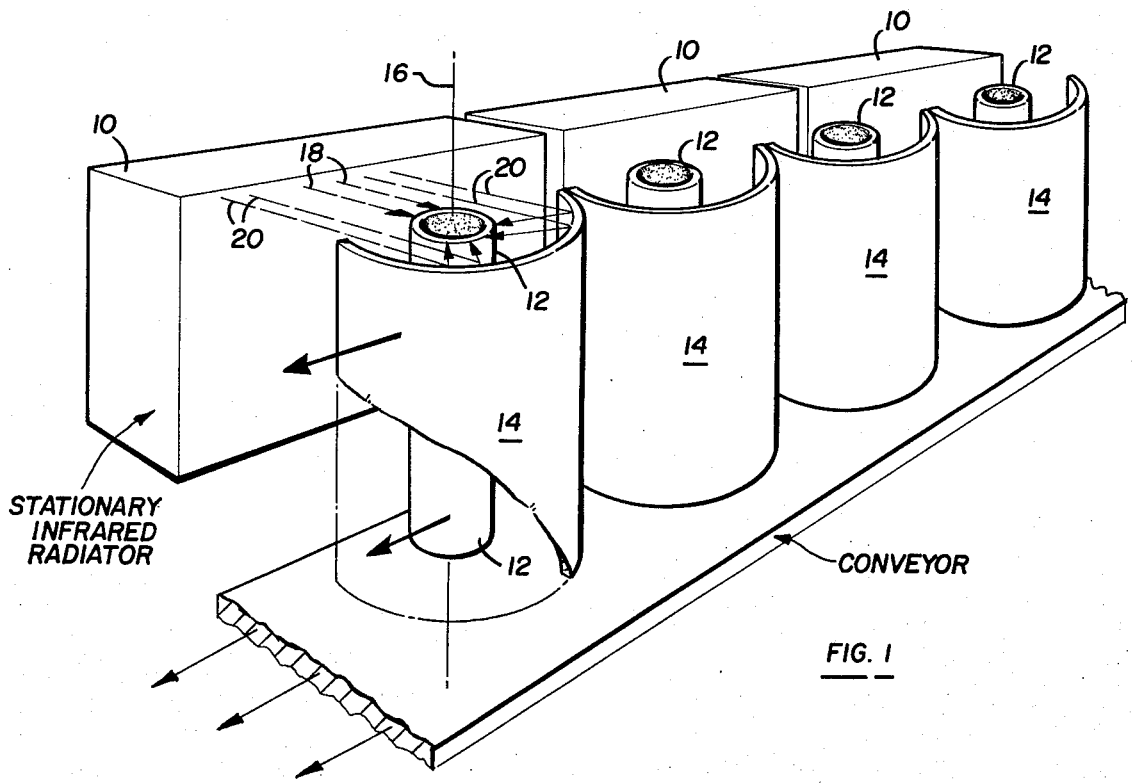

United States Patent [19]
Goos et al.

[11] 3,975,618
[45] Aug. 17, 1976

[54] METHOD AND APPARATUS FOR HEATING SYNTHETIC PLASTIC COMPONENTS

[75] Inventors: Heinz Goos, Schenefeld; Peter Rose, Henstedt-Ulzburg, both of Germany

[73] Assignee: Heidenreich & Harbeck Zweingniederlassung der Gildemeister AG, Hamburg, Germany

[22] Filed: Oct. 24, 1974

[21] Appl. No.: 517,442

[30] Foreign Application Priority Data
Feb. 14, 1974 Germany............................ 2406955

[52] U.S. Cl.................................. 219/388; 34/4; 34/105; 198/1; 219/348; 219/349; 264/25; 432/121
[51] Int. Cl.² ....................... F27B 9/06; H05B 1/00
[58] Field of Search ......................... 219/347–349, 219/354, 388, 411, 405, 342; 34/4, 6, 39, 105; 198/1; 264/25, 329, 345; 432/121, 122, 239

[56] References Cited
UNITED STATES PATENTS

| | | | |
|---|---|---|---|
| 2,318,533 | 5/1943 | Selvig............................ | 219/352 X |
| 2,349,300 | 5/1944 | Olsen.................................. | 34/39 |
| 2,354,658 | 8/1944 | Barber.............................. | 219/349 |
| 2,497,676 | 2/1950 | Lashells......................... | 219/354 X |
| 3,227,065 | 1/1966 | Litman............................ | 219/349 UX |
| 3,310,653 | 3/1967 | Crockett......................... | 219/349 X |
| 3,460,930 | 8/1969 | Pityo............................. | 219/349 UX |
| 3,648,594 | 3/1972 | Humdhausen............... | 219/348 UX |

*Primary Examiner*—A. Bartis
*Attorney, Agent, or Firm*—Cullen, Settle, Sloman & Cantor

[57] ABSTRACT

An apparatus and method for heating parisons or other thermoplastic components preparatory to forming the component to a different shape, as by blow molding. The parisons are heated by conveying them past an elongated infra-red radiator in spaced relation to the radiator. A concave reflector is provided for each parison, the reflector being movable with the parison in fixed relation thereto. The parison is located at the focal location of the reflector so that heat from the radiator bypassing the parison is reflected back to the parison.

6 Claims, 2 Drawing Figures

METHOD AND APPARATUS FOR HEATING SYNTHETIC PLASTIC COMPONENTS

FIELD OF THE INVENTION

This invention relates to apparatus heating components of synthetic plastics material during movement thereof between at least one infra-red radiator and a reflecting surface.

BACKGROUND OF THE INVENTION

During plastics moulding operations, for example, blow-moulding, blanks or parisons are pre-heated using infra-red radiators which allow very short heating periods of only a few seconds. Infra-red heat treatment offers the advantage of heating not only the outer surface of the plastics material but also of directly reaching the material below the outer surface.

Nevertheless the thermal energy is absorbed to a large extent by the material closest to the heat source. This causes a high temperature peak on the surface of an article during intensive radiation. When heating blanks made of synthetic plastics material, the blanks have been treated, for example, in such a way that the material to be heated moves past the infra-red radiator approximately equidistantly from the infra-red radiator and a flat reflector.

Heating of the blanks is effected by direct radiation, indirect radiation and by convection. Convection is very high in this system, since a large proportion of the radiated energy is returned to the radiator by the flat, parallel reflector; therefore, the system retains a high temperature. Moreover, convection can lead to undesirable over-heating of some parts of the outer surface of a blank.

Because plastics materials are poor conductors of heat, the temperature balance within the walls of a hollow or solid blank takes place only relatively slowly during the short heating period for which infra-red radiation treatment is effected. When components with a large wall thickness have to be heated a little longer than usual so as to obtain the required amount of thermal energy, this often leads to undesirable changes in the surface layer, for example a change in the structure or configuration of the material due to overheating or the appearance of crystallisation phenomena in, for example, polyethyleneterephthalate, (PET).

An object of the invention is to avoid the disadvantages of known heating apparatus, and in particular to ensure that the required heating time for heating a component is shortened, to prevent overheating of the radiator by reflected radiation and thereby relieve the infra-red radiator to give it a longer life.

SUMMARY OF THE INVENTION

According to the invention there is provided apparatus for heating components of synthetic plastics material during movement thereof between at least one infra-red radiator and a reflecting surface, wherein the reflecting surface comprises a concave reflector.

Heating by infra-red radiation is achieved, therefore, not only directly by the heat source but, in addition, by the curved reflector, the configuration of which is preferably closely allied geometrically to the configuration of the components to be heated, which collects a large number of the infra-red rays otherwise not meeting the semi-finished material and reflects these rays on to the semi-finished material arranged at the focal point, focal area or focal line — according to the formation of the reflector. From this result shorter heating periods and the heat source is relieved, since no energy is thrown back on to the heat source from the secondary reflector. Besides, the amount of heat source required is decreased, and the capacity of the arrangement can be optimised with the improved heating arrangement.

Thereby the proportion of energy rays transmitted by curved reflectors is increased and scarcely any wastage of rays occurs, so that less energy is consumed for the same production output, as a result of the higher thermal efficiency and investment costs are saved. The possibility of the radiator's own temperature being increased by stray rays reflected back into the radiator is avoided. Therefore, the additional heating of the surface layer of the semi-finished material, produced by convection and radiation is eliminated. Moreover, the balancing time, in which the temperature gradient in the wall of the material, which has been heated, oscillates at an average temperature is shortened.

In further developments of the invention the curve of the reflector adjusts to the shape of the material to achieve even heating of the material. Thus the shape of the material to be heated can be constantly represented by the formation of the reflector and the reflector can be formed with many axes.

Moreover, the focal area or focal area line respectively of the reflector can be the same or smaller than the sectional surface of the material to be heated. The material to be heated is appropriately arranged in the focal area of the reflector.

In a further development, the reflector shows a parabolic or elliptical shape. These parabolic or elliptical shapes can, however, be replaced to advantage by ones approaching a spherical shape which are easier to produce from the point of view of manufacture.

In a profitable extension of the invention several reflectors are placed in line with the movement of the material opposite the radiator, and the space between their axes is the same as the space between the pieces of material. Thus the reflectors are so arranged that they span the entire space between the pieces of material, so that no wastage of rays occurs.

Finally, in a profitable extension of the invention the rays are produced by one infra-red "light" radiator at least. Since, as already mentioned at the outset, the temperature gradient within the walls of the semi-finished material is considerably decreased during the use of "light" radiators, "light" radiators are used chiefly as a heat source, especially in heating thick-walled semi-finished material with a wall thickness of some 3mm. Such "light" radiators are, however, fundamentally more sensitive with respect to additional heating by reflected rays than the known "dark" radiators. By using the reflectors according to the invention it is possible to use "light" radiators with their named advantages and to increase their life span considerably.

Figure 2:
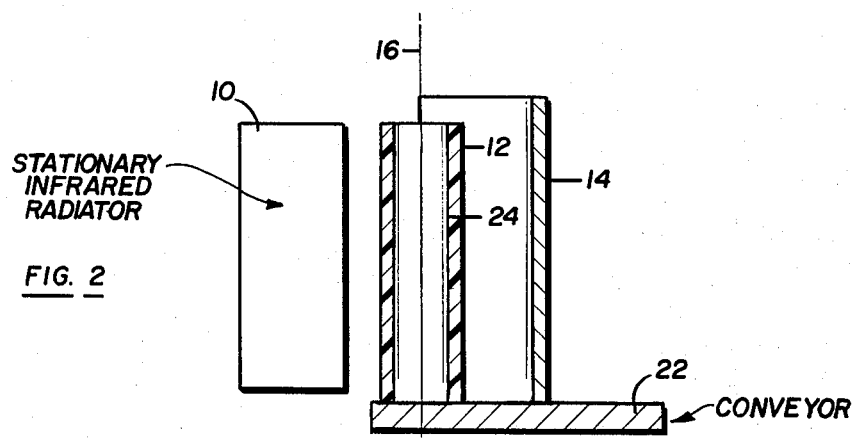

The invention will now be described by way of example with reference to one embodiment thereof which is illustrated in the accompanying drawings. FIG. 1 is a perspective view of the apparatus of the present invention for heating plastic blanks, and FIG. 2 is a sectional view taken along the plane 2—2 of FIG. 1.

As shown in the drawing, one side of a heating channel is formed by a series of infra-red radiators 10. Thermoplastic components, for example, tubular blanks to be moulded, are marked 12. Next to the blanks 12 and on the opposite side of the heating channel, a plurality of concave mirrors 14 are provided and these act as secondary radiators, one blank 12 being disposed with its axis in coincidence with the focal axis 16 of each mirror at any given time. The direction of movement of the blanks 12 and the mirrors or reflectors 14 relative to the radiators 10 is shown by an arrow. Each blank 12 is heated by the direct rays 18 emitted from the infra-red radiators 10, as well as by the rays 20 which have been reflected from and focussed by the reflector 14. As shown in FIG. 2, the blanks 12 and the reflectors 14 are both carried by a conveyor means 22 movable relative to radiators 10.

Although it is preferred that the reflectors and blanks should move together relative to the radiators 10, the reflectors can also be situated in fixed positions, but in this case the blanks should be moved gradually and in step-by-step manner, since otherwise the intended result, i.e. to raise the thermal efficiency and to relieve the radiators of reflected radiation, is not achieved. As shown, the individual reflectors together with the blanks move past the radiator surface so that the relationships between the rays shown in the drawing are always kept the same. The shapes of the reflectors will depend on the configurations of the blanks. As shown, the blanks are substantially cylindrical and the reflectors 14 are of part-cylindrical form. However, if the blanks were of elliptical or parabolic cross-section, the reflectors would be shaped accordingly.

The total energy emitted by the radiators is effectively absorbed by the blanks and is not reflected back to the radiators. Therefore, the radiators are not overburdened. The degree of convection which occurs is insignificant and the thermal efficiency of the apparatus is high, each blank being heated in a continuous manner as it moves past the radiators 10 with a substantially constant temperature gradient set up in the channel along which the blanks are moved.

A further important advantage is that substantially the whole of the surface of each blank is heated to a uniform extent and localised heating effects on said surface are avoided.

After being heated to the required temperature, the blanks are conveniently fed to a blow-moulding machine for the production of, for example, plastics bottles.

What is claimed is:

1. In an apparatus for heating a thermoplastic component preparatory to forming the component to a different shape, an elongated infra-red radiator assembly, a concave reflector facing said radiator assembly in spaced relation thereto and having a focal location spaced from the radiator assembly at which infra-red radiation from said radiator assembly is focused, means for supporting the component intermediate the radiator assembly and the reflector and at the focal location of the reflector, and means for jointly displacing the the component support means and the reflector in a path along the length of the radiator assembly, while maintaining the component in fixed relationship to said focal location.

2. In an apparatus for heating an essentially tubular thermoplastic parison preparatory to blow molding the parison, an elongated infrared radiator, means for supporting the tubular parison in spaced relation to the radiator to receive heating radiation therefrom, an elongated infra-red radiation reflector having a concave reflective face directed toward said radiator and said parison, said reflector having a focal line at which radiation falling thereon is focused, the parison being located with its longitudinal axis coincident with the focal line of the reflector, and means for concurrently displacing the parison and the reflector in a path along the length of the radiator assembly while maintaining the parison in fixed relationship to the focal line of said reflector, so that the reflector directs radiant energy from the radiator bypassing the parison on to the parison.

3. In an apparatus for heating thermoplastic parisons preparatory to a blow molding operation, the improvements of an elongated infra-red radiator assembly, a plurality of generally semi-cylindrical infra-red radiation reflectors spaced from and facing said radiator assembly, each of said reflectors having a focal line at which radiation falling thereon is focused, parison support means for supporting a parison at the focal location of each of said reflectors, and means for moving said reflectors and said parison support means in a path along the length of said radiator assembly in unison, each parison remaining at the focal location of its reflector during such movement.

4. In a method of heating a thermoplastic parison of essentially tubular configuration, the steps of interposing the parison between an elongated infra-red radiator and the facing concave reflective surface of an infra-red radiation reflector having a focal line at which infra-red radiation from said radiator is focused, with said parison being located with its longitudinal axis coincident with the focal line of said reflective face so that the parison receives radiation directly from the radiator and indirectly by reflection from the reflector, and concurrently displacing the parison and the reflector in a path along the length of said radiator while maintaining the parison in fixed relationship to the focal line of the reflector.

5. In a method of heating a thermoplastic parison of essentially tubular configuration, preparatory to a later blow-molding operation, the steps of displacing the parison along the length of an elongated infra-red radiator to receive direct heating radiation therefrom, concurrently displacing a concave infra-red radiation reflector having a focal location at which radiation from said radiator is focused with the parison while maintaining the parison at the focal location of the reflector thereby additionally indirectly heating the parison by the infra-red radiation from said radiator which bypasses the parison and is reflected onto the parison by said reflector.

6. In a method of heating a thermoplastic blank prior to a later forming operation, the steps of interposing the blank between an elongated infra-red radiator and the reflective face of an infra-red radiation reflector having a focal location at which radiation from said radiator is focused, the blank being located at the focal location of said reflective face, and jointly displacing the blank and the reflector along the length of said radiator while maintaining the blank in fixed relation to the focal location of the reflector to (1) heat the blank by direct radiation from said radiator, and (2) to additionally heat the blank by indirect radiation reflected thereon from said reflective surface.

* * * * *